United States Patent [19]

Ament

[11] Patent Number: 5,538,306

[45] Date of Patent: Jul. 23, 1996

[54] WEB COVER OR ARRANGEMENT FOR THE TRUNK SPACE OF A MOTOR VEHICLE

[75] Inventor: Eduard Ament, Aichwald, Germany

[73] Assignee: Baumeister & Ostler GmbH & Co., Germany

[21] Appl. No.: 499,600

[22] Filed: Jul. 11, 1995

[30] Foreign Application Priority Data

Jul. 12, 1994 [DE] Germany .......................... 44 24 498.3

[51] Int. Cl.⁶ ..................................................... B60R 5/04
[52] U.S. Cl. ..................... 296/37.1; 296/37.16; 296/100; 160/84.06
[58] Field of Search ................................ 296/37.1, 37.8, 296/37.16, 98, 100; 160/84.01, 84.06, 84.08, 323.1, 903

[56] References Cited

U.S. PATENT DOCUMENTS 4,932,704  6/1990  Ament .......................... 296/37.16

FOREIGN PATENT DOCUMENTS

| 2694732 | 2/1994 | France | 296/37.16 |
| 3906196C2 | 1/1991 | Germany . | |
| 4110089A1 | 1/1992 | Germany . | |
| 4200021 | 7/1993 | Germany | 296/37.16 |

Primary Examiner—Dennis H. Pedder
Attorney, Agent, or Firm—Leydig, Voit & Mayer, Ltd.

[57] ABSTRACT

A cover for the access opening of a motor vehicle. The cover has a web by which the access opening is to be closed. On the sides of the access opening are attached guide rails in which the struts attached to the web travel back and forth. In order to remove or reinstall easily the web from the vehicle, there are receiving pieces which cooperate with the guide rails to receive the ends of the struts when the web is retracted. To prevent an inadvertent separation of the struts and roller web from the receiving means when the cover is removed from the guide rails, there are blocking arrangements which prevent the struts from leaving the receiving pieces unless the receiving pieces are attached to the guide rails.

23 Claims, 6 Drawing Sheets

WEB COVER OR ARRANGEMENT FOR THE TRUNK SPACE OF A MOTOR VEHICLE

BACKGROUND OF THE INVENTION

This invention relates to a roller cover or an arrangement for the trunk space of a motor vehicle.

Especially in so-called "station wagons," the storage or trunk space present behind the rear seat can be seen into from outside because in the standard body no coverings are provided. Such coverings would be troublesome when relatively large objects are to be accommodated in the storage or trunk space or when the rear seat is turned over or raised to increase the storage or trunk space.

The ability to freely view the storage or trunk space is frequently found undesirable. As a result, roller covers are available as an accessory for the storage or trunk space of vehicles. These roller covers are fastened to the back of the rear seat or to the sides of the vehicle's body in the immediate proximity of the rear seat. The roller web of the roller cover can then be drawn over the storage or trunk space opening.

Often spring roller-like constructions are used because they are easier to remove. Such spring roller-like constructions have the disadvantage of clearly sagging in the middle and being sensitive to loading.

From DE-A 38 19 766 there is known a roller cover with a number of struts in a parallel spaced relationship from one another on the roller web. These struts reinforce the roller web and are guided on their ends by two guide rails in a parallel spaced relationship from one another. There are receptacles which cooperate with the guide rails, and when the roller cover is retracted receive the ends of all the struts. The receptacles, struts, and roller web are separable from the guide rails.

With the above arrangement, the struts rest in the receptacles by means of a leaf spring. As a result, when the struts and receptacles are removed from the vehicle, unfavorable handling can overcome the resting force of the leaf spring and the struts can be separated from the receptacles even though such a result is not desired. In order to overcome this problem the resting means had to be very strong. The strong resting means, however, hampered the handling of the roller web when the roller cover was installed in the vehicle.

SUMMARY OF THE INVENTION

The purpose of this invention is to create a cover or arrangement for storage or trunk spaces of motor vehicles which can be removed and reinstalled easily when necessary and with which there is no danger that the struts can drop out of the receptacles when the roller cover is taken out of the vehicle.

The cover according to the invention securely locks the struts when the receptacles are separated from the guide rails. The struts, however, are freely movable out of the receptacles and into the guide rails when the roller cover is installed in the guide rails in the motor vehicle.

Each locking member is movable in a direction which has at least one component parallel to the struts. Because the locking member has a stop surface which, when in the locked position, extends into the path of movement defined by the receptacle of the end sections of the struts, the locking members cannot be transferred into the free position by pressure from the struts.

An especially simple and stable construction can be achieved if the locking member is constructed as a pusher so that its force is exerted from the struts onto the locking member in the direction freeing position. The locking member could also be constructed as a bolt capable of turning with a turning axis essentially transverse to the longitudinal axis of the struts. This second embodiment has the advantage that the locking mechanism is less sensitive to jamming, for example because of dirt in the mechanism.

Additionally, a security arrangement is allocated to the locking member to hold the locking member in the locked position when the receptacle is removed from the guide rails. This security arrangement can simply be formed by a spring, especially by a leaf spring, engaging on the actuating member. An especially simple actuation of the actuating member can be achieved if the actuating member in the locked position projects from an outer side opposite the struts of the corresponding receptacle.

For protection against inadvertent actuation of the actuating member, for example while putting away a cover that has been removed from the vehicle, it is especially advantageous to provide the receptacle with a protective collar, protruding to the outside, which does not hamper an intended actuation of the actuating member when installing the receptacles in the guide rails.

For the correct positioning of the receptacle, the receptacle can be provided with a guide means cooperating with the corresponding guide rail on an end concerned of the guide rail. The guide means is most simply realized if the guide means has two projections with which it grips around the upper side and underside of one guide rail end. A secure hold is ensured and rattling is prevented if to each receptacle there is assigned a bias-tensioning arrangement which presses the receptacle against a corresponding guide rail end.

In the installing of the receptacle the receptacle should be pressed by pressure from underneath upward against this bias-tensioning arrangement. It is useful if at least one part of the surface with which the receptacle is pressed against the corresponding guide rail end is oblique to the longitudinal axis of the guide rail.

It is also useful if the receptacle has a first control arrangement part which cooperates with a second control arrangement part present on the receiving pocket in such manner that the actuating member comes into engagement with the corresponding receiving pocket part and transfers the locking member into the free position only when the receptacle has reached a position in which the struts can travel only along the guide rails. As a result, the situation in which the locking arrangement for the struts is open while the guide slit of the respective receptacle is not connected to the adjacent guide rail is avoided. If the user in this situation should pull on the struts, he would merely pull the receptacle away from the receiving pocket. This characteristic of the invention will be described in more detail later.

An especially simple, sturdy, and easy to handle realization of the control arrangement parts consists of a projection or lug as one of the two control parts and a slide block guide as the other guide arrangement part.

The handling is simplified and the position in which the locking member is transferred into the free position or into the locked position is exactly established when the slide block guide has two guide sections which transition into one another at an apex and which are formed in such a way that the first guide section, in a movement of the apex or of the projection proceeding from the apex along the first guide section forces a movement of the receptacle onto the appertaining guide rail end, and the second guide section in a movement of the lug or of the projection along the second guide section proceeding from the apex, forces a downward movement of the receptacle. Furthermore, the apex is arranged so that in the case of a lug or projection present on the apex the guide means of the receptacle are spaced from the guide rail end.

The slide block guide can be formed in the receiving pocket in which case the lug or projection is present on the outside of the receptacle. Alternatively, the slide block guide can be constructed in the outside of the receptacle, in which case the lug or projection is present in the receiving pocket.

For the support of each receptacle there is provided preferably a receiving pocket which has an opening pointing toward the opposite receiving pocket. The opening is an extension of the respective guide rail. The receiving pocket must also have an installation opening.

In order to prevent the struts from slipping out of the end of the receptacle lying away from the guide rail end, because this end does not have a locking member, the receptacle is preferably at least partly closed at the end lying away from the guide rail end.

So that the roller cover can be opened also from the back seat, the receptacle is provided with a rest arrangement by which the strut adjacent to the rear seat is held rested. The user by exerting appropriate force can shift the strut to the rear past the rest arrangement and into the guide rails.

In order to ensure parallel movement of at least the first and/or last struts, a synchronizing arrangement is present. The synchronizing arrangement consists of gear wheels, attached firmly to the ends of the struts to ensure against twisting, which engage in gear racks contained in the guide rails. As a result, the struts cannot jam because of crooked pulling and the extracting and retracting of the roller web is made substantially easier.

BRIEF DESCRIPTION OF THE DRAWINGS

The drawings represent two examples of executing the object of the invention. In the drawings.

DETAILED DESCRIPTION OF THE PREFERRED EMBODIMENTS

Figure 1:
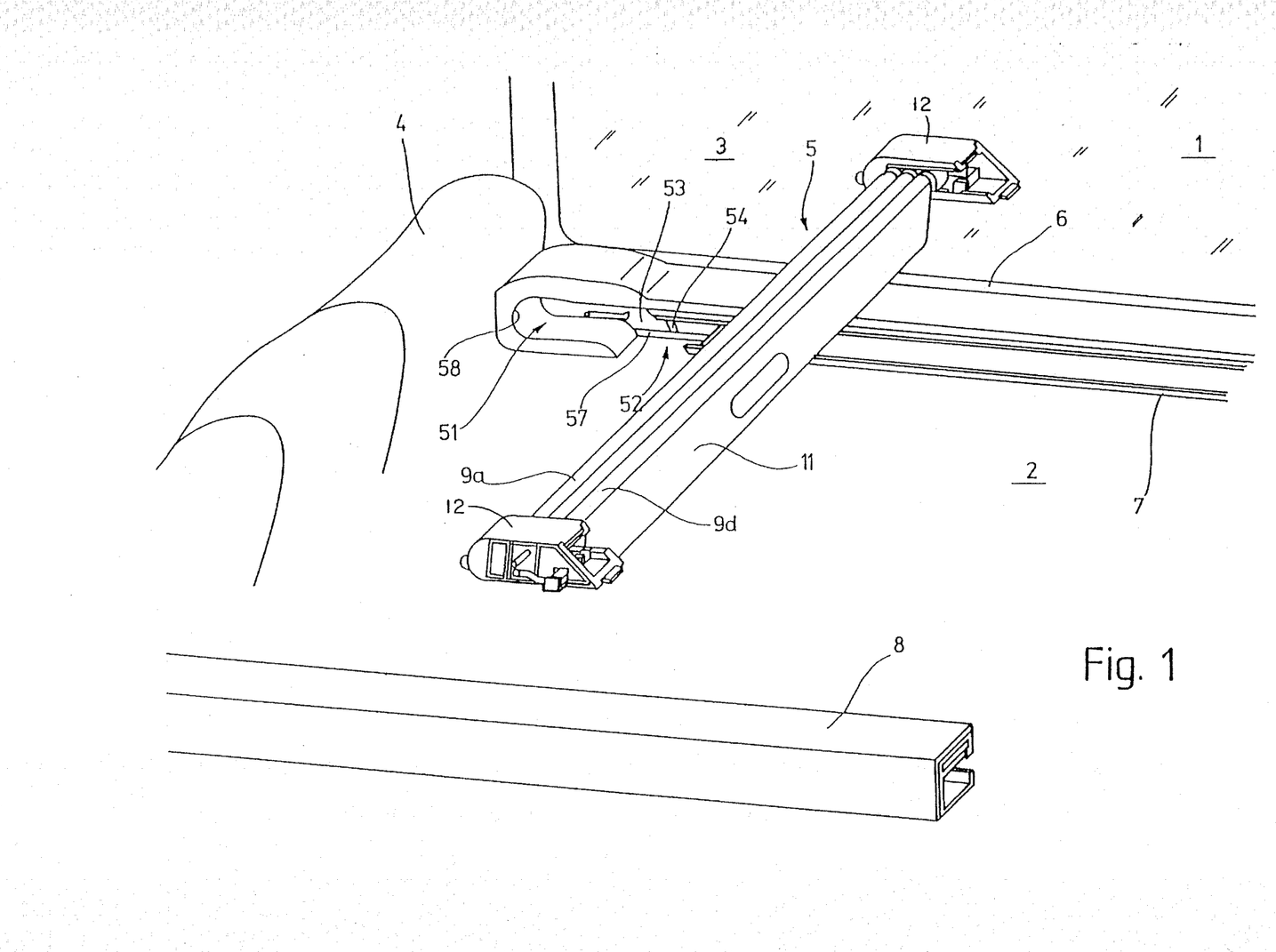
FIG. 1 is a perspective view, in which one side of the passenger car is broken away, showing a cover according to the invention.

In FIG. 1 there is illustrated the loading space 1 of a station wagon. Over a side wall 2 there is located a rear stern window 3, while the rear seat back 4 forms the front closure of the loading space 1.

For covering the loading space 1 there is provided the cover 5 which is located just under the lower edge 6 of the side window 3 and is arranged at about the height of the upper edge of the rear seat back 4. The cover 5 has two straight guide rails 7 and 8, situated in a parallel spaced relationship from one another, which are fastened just underneath the lower edge of the adjacent side windows 3 on each of the two side walls 2. The guide rails 7 and 8 extend from about the back of the rear seat back 4 to a stern opening (not shown) of the vehicle, which is to be closed by a loading flap (not shown).

The guide rails 7 and 8 guide the tubular struts 9a to 9d which run parallel to one another and are supported after installation by their ends in the guide rails 7 and 8. The tubular struts 9a to 9d carry the web 11, on which they are equidistantly distributed and fastened. The web 11 is a substantially rectangular plastic foil cut-out, which if need be has a substance reinforcement. The width of web 11 is equal to the distance between the two guide rails 7 and 8, while the length of the web 11 corresponds to the distance between the back of the rear seat back 4 and the stern opening (not shown). When the cover is open, the last strut 9d is joined with the edge of the roller web 11 and is positioned adjacent to the stern opening (not shown), while the most remote-lying strut 9a rests in the vicinity of the rear seat back 4. By manual shifting of the last strut 9d in the direction away from the rear seat back 4, the web 11 can be spread over the loading space 1 in order to close off the loading space 1. Alternatively, the web 11 can be pushed back in the direction of the rear seat back 4 forming downward-hanging folds between the struts 9a to 9d when the struts 9a to 9d are thrust tightly together.

In order to remove easily the web 11, together with the struts 9a to 9d which are fastened to it, when the loading space 1 is to be enlarged by turning over the rear seat back 4, the cover is provided with two receiving pieces 12 which in the installed state serve as extensions of the corresponding guide rails 7 and 8. The receiving pieces 12 have a greater extension in the direction of the longitudinal axis of the guide rails 7 and 8 than transversely thereto. The length of the receiving pieces 12 correspond to the space required by the struts 9a to 9d when the roller web 11 is fully gathered-up.

Because the two receiving pieces 12 are identical aside from their mirror image nature, the following description of the receiving pieces 12 is made only for one receiving piece. The description is valid analogously for the other receiving piece.

Figure 2:
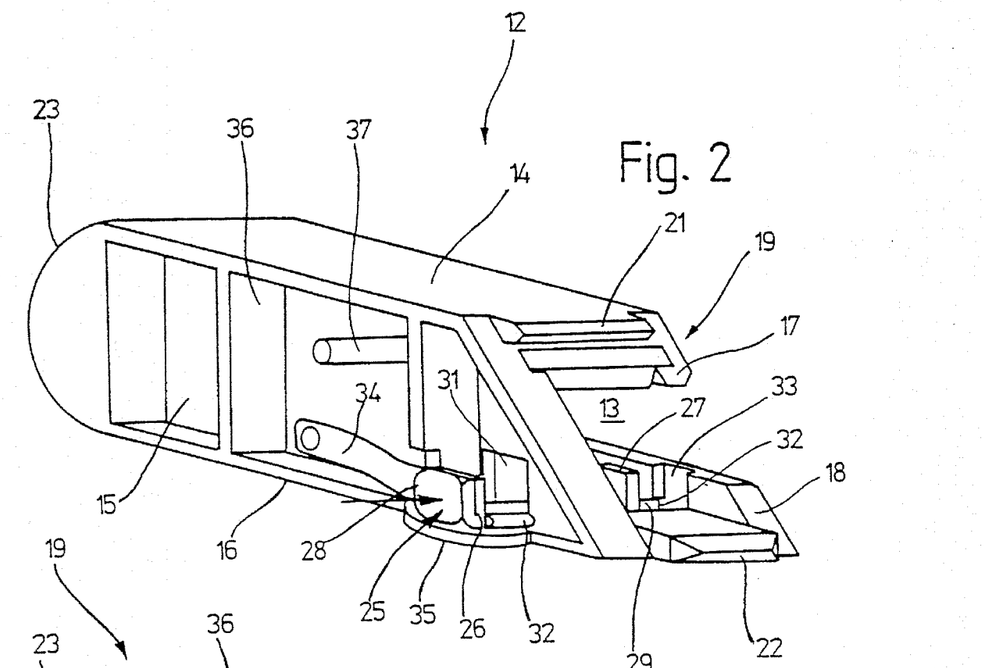
FIG. 2 is a perspective view of a receptacle with locking member in the locked position.
Figure 3:
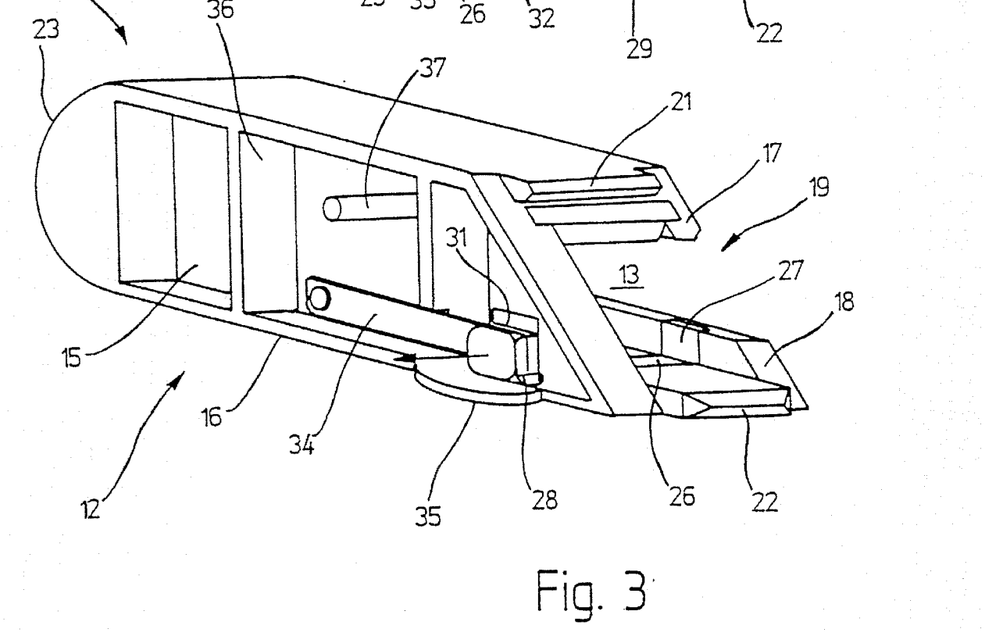
FIG. 3 is a perspective view of a receptacle with locking member in the free position.

The receiving piece 12 is represented in detail in FIGS. 2 and 3. The receiving piece 12 is essentially a longitudinally slit tube piece with a C-shaped rectangular profile which has the slot 13 parallel to the longitudinal axis. On the free ends of the receiving piece 12, lying remote from the side wall 15 of the upper wall 14 and of the lower wall 16, there are molded two flanges 17, 18 facing one another and bounding the slot 13. The cross sectional profile of the receiving piece 12 corresponds to the C-shaped receiving pocket profile. The guide rails 7 and 8 form together with the corresponding receiving piece 12 a continuous path of movement for the ends of the struts 9a to 9d.

At the one end 19, which cooperates with one of the guide rails 7 or 8, the receiving piece 12 is open and has on the upper wall 14 and the lower wall 16 projections in the form of the ribs 21 and 22. The open end 19 is beveled in such manner that the lower wall 16 is longer than the upper wall 14. At its other end, the receiving piece 12 is closed by the hemicylindrical wall 23, the axis of curvature of which lies parallel to the axis of the struts 9a to 9d.

The receiving piece 12 contains the locking member 25 in the vicinity of the open end 19. The locking member 25 consists of the oblong crosspiece 26 which in one piece is provided on one end with the slab-form blocking member 27 and on the opposite end with the actuating member 28.

The crosspiece 26 of the locking member 25 slides longitudinally into the groove 29. The groove 29 is located in the inside of the lower wall 16 and runs transversely to the path of movement of the struts 9a to 9d. As a result, the blocking member 27 extends into the path of movement of the strut ends. The groove 29 aligns with an opening 31 in the side wall 15 and is provided with undercut cross section profile, to which the crosspiece 26 is complementary. In this manner the locking member 25 can be moved only in the longitudinal direction of the groove 29. The locking member 25 is secured against a lifting out in an upward direction from the groove 29 because the cross section profiles of the groove 29 and the crosspiece 26 have a hemicylindrical profile 32 on the flanks. The blocking member 27 in the locked position extends upward from the groove 29 into the interior of the receiving piece 12 and into the path of movement of the ends of the struts 9a to 9d. In the free position, the blocking member 27 lies withdrawn in the recess 33 complementary to the blocking member 27. The recess 33 is located in the flange 18 of the lower wall 16. The blocking member 27 is then moved out of the clear space profile of the interior of the C-shaped receiving piece 12.

As shown in FIG. 2, the actuating member 25 is slab-shaped and projects outward from the side wall 15 of the receiving piece 12 when in the locked position.

In a slot of the actuating member 28 there is fastened the leaf spring 34 which extends substantially parallel to the longitudinal axis of the receiving piece 12. The other end of the leaf spring 34 is anchored on the outside of the side wall 15. The leaf spring 34 is formed so that in its relaxed or rest position the locking member 27 moves out of the recess 33 and a certain distance into the interior of the receiving piece 12.

In order to prevent an inadvertent actuation of the locking member 25, underneath the opening 31 extending from the lower wall 16, there is arranged the projection 35 which overhangs laterally the actuating member 28 when the leaf spring 34 is in its relaxed position.

For the purpose of reinforcing the receiving piece 12, there are a series of projecting ribs or strips 36 on the sidewall 15. Furthermore, the outside of the side wall 15 carries above the leaf spring 24 the projection 37, which is part of a slide block guide still to be described.

Figure 4:
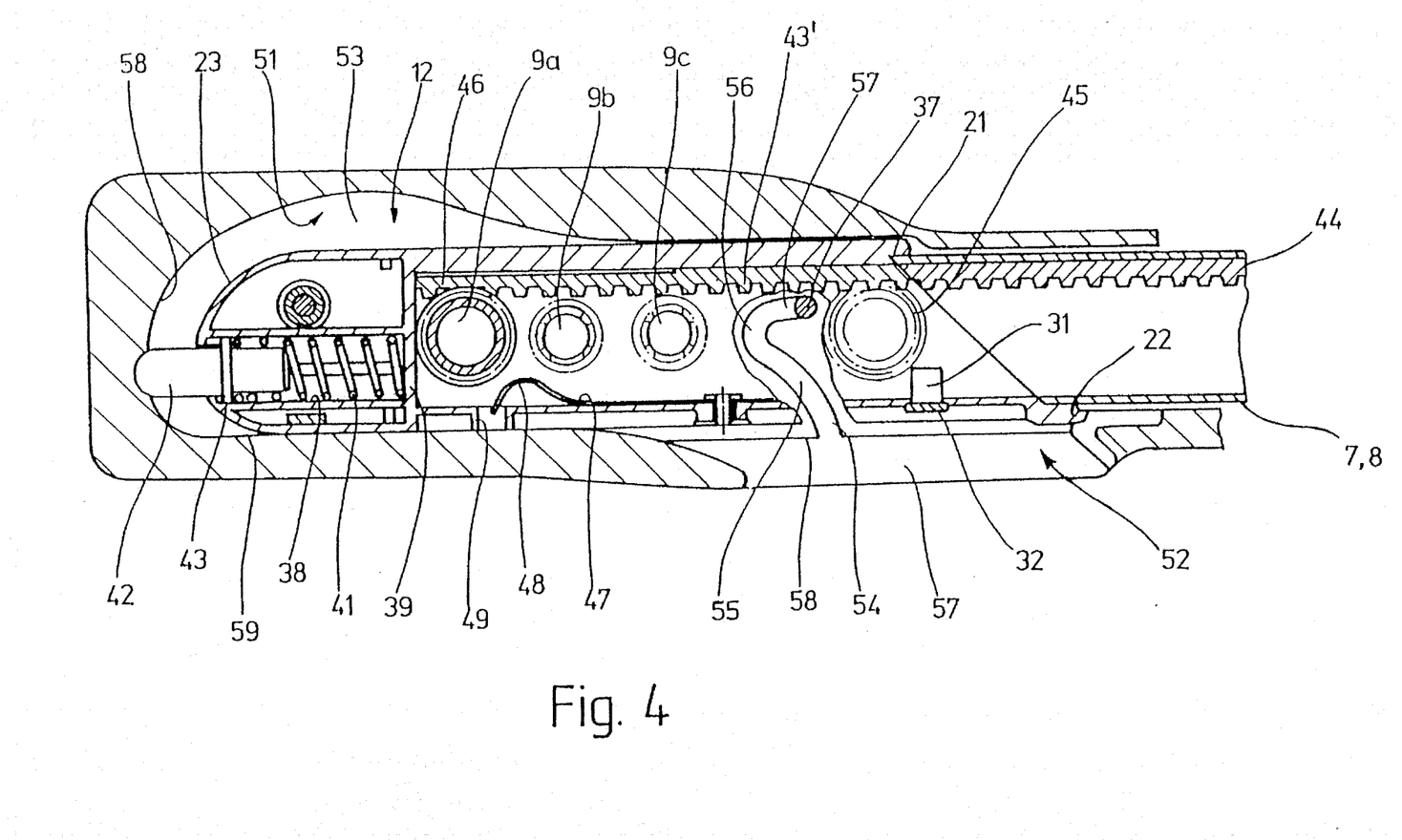
FIG. 4 is a longitudinal view of a receptacle in an installed state.

As is evident from the cross section according to FIG. 4, behind the cylindrical wall 23 there is present the blind receiving bore 38 which ends at the wall 39. In the receiving bore 38 there is inserted the pressure spring 41, constructed as a screw spring, with the aid of which the longitudinally slidable rest member 42 is biased into its outward-advanced position. The rest member 42 is slidable in a longitudinal direction parallel to the slot 13. A collar (or flange) 43 on the rest member 42, together with a corresponding shoulder which extends into the blind bore 38, prevents the rest member 42 from being completely thrust out by the spring 41.

As FIG. 4 further makes evident, on the inside of the upper wall 14 there is fastened a piece of a gear rack 43', which aligns in exact graduation with the gear rack 44 in the guide rail 7 or 8. Gear racks 43' and 44 cooperate with the gear wheels 45 which sit, secure against turning, on the strut 9d and engage into the gearing of the gear racks 43' and 44. In the case of asymmetrical force introduction, with the aid of the gear racks 43' and 44 and of the gear wheels 45 seated on the strut 9d, both ends of the strut 9d are displaced by equal amounts and thus an inadvertent jamming of the struts is prevented.

Also the strut 9a immediately adjacent to the rear seat back 4 is freely movable and, therefore, carries its own gear wheels 46 on both ends which mesh similar to gear wheels 45 with the gear racks 43' and 44. In order to prevent the strut 9a from pulling away because of the recoil force of the web 11 when the cover 5 is spread out, on the inside of the lower wall 16 there is present the rest spring 47. The free end 48 of rest spring 47 extends as a rest lug upward into the interior of the receiving piece 12 and rests the strut 9a against the end wall 39. The holding force through the rest spring 47, which is executed as a leaf spring, can be overcome in order to shift the strut 9a away from the rear seat back 4 and towards the stern of the storage space 2. When the holding force of the rest spring 47 is overcome, the free end of the rest spring 47 springs into a corresponding opening 49 in the lower wall 16 in order to make possible the passage of the strut 9a.

The receiving pieces 12 are supported by the receiving pockets 51. The receiving pockets 51 are extensions of guide rails 7 and 8 and are located between the end of guide rails 7 and 8 and the back of the rear seat back 4. The receiving pockets 51 are open in the direction facing one another. In the vicinity of the transition place to the respective guide rail 7 or 8, the receiving pockets 51 are provided with an opening 52 on the underside. Towards the body of the car the receiving pockets 51 are bounded by the side wall 53, in which there is the groove 54 serving as a slide block. The groove 54 cooperates with the projection 37 and together form the already mentioned slide block guide. The groove 54 begins in the zone of the opening 52 with an upward rising branch 55, which is directed away from the guide rails 7 or 8. The rising branch 55 ends at the apex 56. From the apex 56 the groove 54 continues into the branch 57, which extends in its last section in a direction parallel to the longitudinal extension of the guide rails 7 or 8.

On the end lying away from the guide rails 7 or 8 the receiving pocket 51 is closed by a wall 58.

Figure 5:
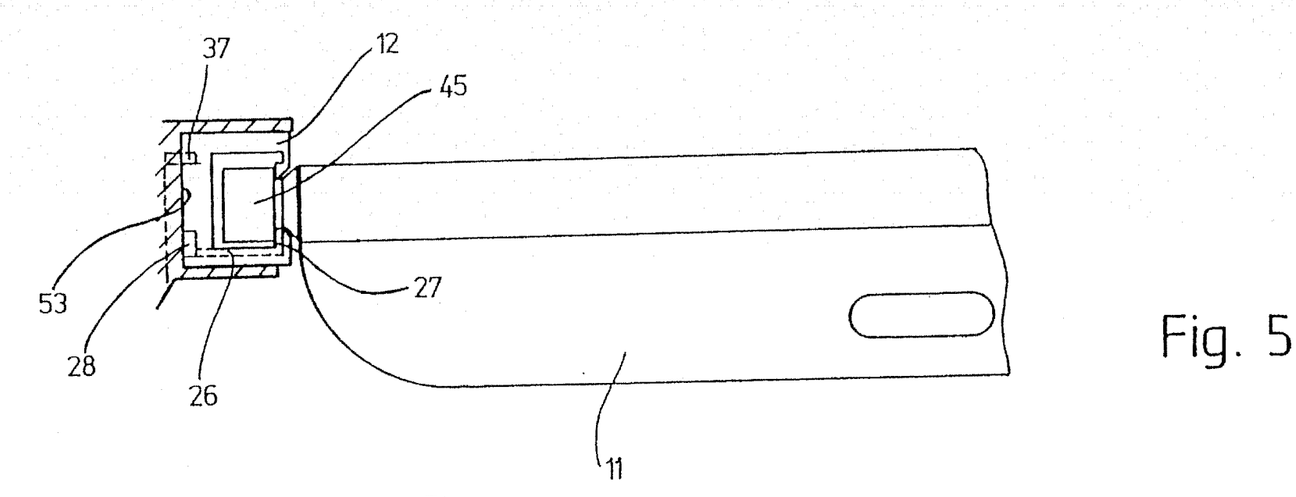
FIG. 5 is a cross sectional view, as seen from the guide rails, of the receptacle, web, and struts properly positioned in the receiving pocket with the blocking member in the free position.
Figure 6:
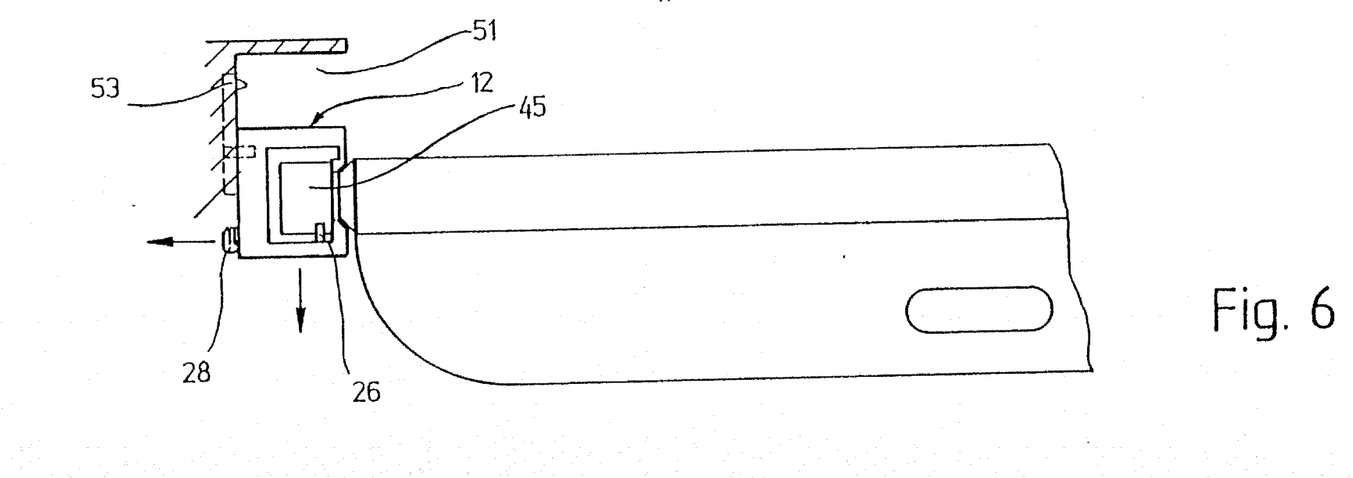
FIG. 6 is a cross sectional view similar to FIG. 5 of the receptacle, web, and struts partially taken out of the receiving pocket with the blocking member in the locked position.

The device thus far described is handled as follows. Additional references will be made to FIGS. 5 and 6. Before the installing of the cover 5 in the passenger car the web 11, as shown in FIG. 1, is thrust together with all the struts 9a to 9d present with their ends in the appropriate receiving pieces 12. In such a state, the web is an easy to handle packet. Before installation, the leaf springs 34 of the receiving pieces 12 push the locking members 25 outward, as shown in FIGS. 2 and 6. As a result, the blocking members 27 are present within the interior space of the receiving pieces 12 in the path of movement of the ends of the struts 9a to 9d. The struts 9a to 9d, therefore, cannot drop out of the front open end 19 and/or the receiving pieces 12 cannot be drawn away from the ends of the struts 9a to 9d.

If the arrangement present in the packet position is placed on one of the side walls 15 of one of the two receiving pieces 12, the locking of the struts 9a to 9d in the receiving pieces 12 remains preserved because the projections 35 protect the locking members 25 from being pushed in from outside. Even if in especially unfavorable circumstances the projections 35 should not be adequately effective, because the cover 5 with one of the receiving pieces 12, for example, is set up on one edge and the locking member 25 is thrust inward counter to the action of the spring, the locking remains preserved because at least on the other receiving piece 12 the locking member 25 is in the locking position and a withdrawing of the unbolted receiving piece 12 would lead to a turning of the corresponding struts 9a to 9d. The turning of the struts 9a to 9d, however, is effectively prevented because of the proper locking on the other receiving piece 12.

When the cover 5 is used, it is introduced with its receiving pieces 12 into the appropriate receiving pockets 51 from underneath. The corresponding receiving piece 12 with its hemicylindrical wall 23 is inserted from underneath through the underside opening 52. In the course of the introducing movement, the projection 37 is automatically threaded into the guide groove 54. The lower end of the guide groove 54 runs out in the oblique surface 57 of the side wall 53. The oblique surface 57 goes over to a jog 58 which is present, say, in extension of the lower surface 59 of the receiving pocket 51, into a straight vertically ascending wall 53.

As soon as the projection 37 is threaded into the groove 54, the branch 55 forces the receiving piece 12 first to be shifted in a direction towards the wall 58. This assures that the extensions 21 and 22 at the open end 19 cannot hook to the adjacent end of the guide rails 7 or 8 in an unfavorable manner. After the lug 37 has overcome the apex 56, the pressure spring 41, with the aid of the rest member 42 which is supported on the wall 58, can shift the receiving piece 12 to the stern of the vehicle and into the guide rails 7 or 8. As a result, the outside of the guide rails 7 or 8 is gripped over by the extensions 21 and 22, as is shown in FIG. 4.

During the installing, the actuating member 28 first slides along the wall section 57 and then along the wall 53, whereby it is shifted, counter to the action of the leaf spring 34, in the direction toward the side wall 15. This shifting moves the blocking member 27 from the locked position into the free position, as shown in FIGS. 3 or 5. As a result, the inner clear-space profile of the receiving pieces 12 are completely free and the struts 9a to 9d can run unhampered from the receiving pieces 12 into the corresponding guide rails 7 and 8, or, in order to retract the cover 5, the struts 9a to 9d can be thrust back into the receiving pieces 12.

With the cover 5 fully extended, the last strut 9a can be moved from the rear seat if by corresponding force expenditure the effect of the rest spring 47 contained in the receiving pieces 12 is overcome. The rest spring 47, with the aid of the rest lug 48, holds the ends of struts 9a against the wall 39.

A dropping out of the receiving pieces 12 downward from the receiving pockets 51 is prevented by the rest member 42 in conjunction with the extensions 21 and 22, because the rest member 42 presses the end 19 of the receiving pieces 12 against the complimentary ends of guide rails 7 and 8 where a constant proper aligning is ensured between the receiving pieces 12 and the guiding rails 7 and 8.

In order to take out the cover 5, first the struts 9a to 9d are thrust back until they are all located in the receiving pieces 12. Thereafter, the receiving pieces 12 are shifted into the receiving pockets 51, in the direction toward the rear seat back 4, to counter the effect of the pressure spring 41. As a result, the extensions 21 and 22 separate from the ends of the guide rails 7 and 8, while simultaneously the guide projection 37 of the respective receiving piece 12 is moved in the direction toward the apex 56 of the guide groove 54. Only after the projection 37 has passed the apex 56 of the guide groove 54 is it possible by light downward pressure on the struts 9a to 9d for the receiving pieces 12 to be pressed downward in the zone of the entry opening 52.

In order to allow the installing and detaching of the receiving pieces 12, the receiving pockets 51 are enlarged on the obliquely oppositely-lying upper end. In the course of the downward movement of the end 19 of the receiving pieces 12, the locking members 25 are moved back by the leaf spring 34 out of the free position into the locking position, so that immediately after the actuating members 28 have run over the oblique surface 57 the strut ends 9a to 9d are again blocked in the receiving pieces 12. Without the packet position being lost, the cover 5 can now be drawn downward out of the receiving pockets 51. The receiving pieces 12 in the process are forced downward out of the receiving pockets 51 by a cooperation of the blocking members 27 with the ends of the struts 9a to 9d.

With this invention, the danger that the struts 9a to 9d may be separated from the receiving pieces 12 as a result of a downward force on the struts 9a to 9d, as might happen if the struts were only held in the receiving pieces by a rest arrangement, is eliminated. Because with this invention the locking arrangement does not yield to the struts 9a to 9d, the respective receiving pieces 12 can only be separated from the struts 9a to 9d by a destructive force. An inadvertent slipping apart is effectively prevented.

FIG. 5 shows a cross sectional view from the direction of the guard rails. The locking member 25 is shifted into the free position and as a result the blocking member 27 is placed in the recess 33. If, however, as FIG. 6 makes evident, the receiving piece 12 is moved far enough downward, the leaf spring 34 can draw the locking member 25 a certain distance out and as a result the blocking member 27 is moved out of the recess 33 into the blocked position and prevents the gear wheel 45 from leaving the receiving piece 12.

Figure 7:
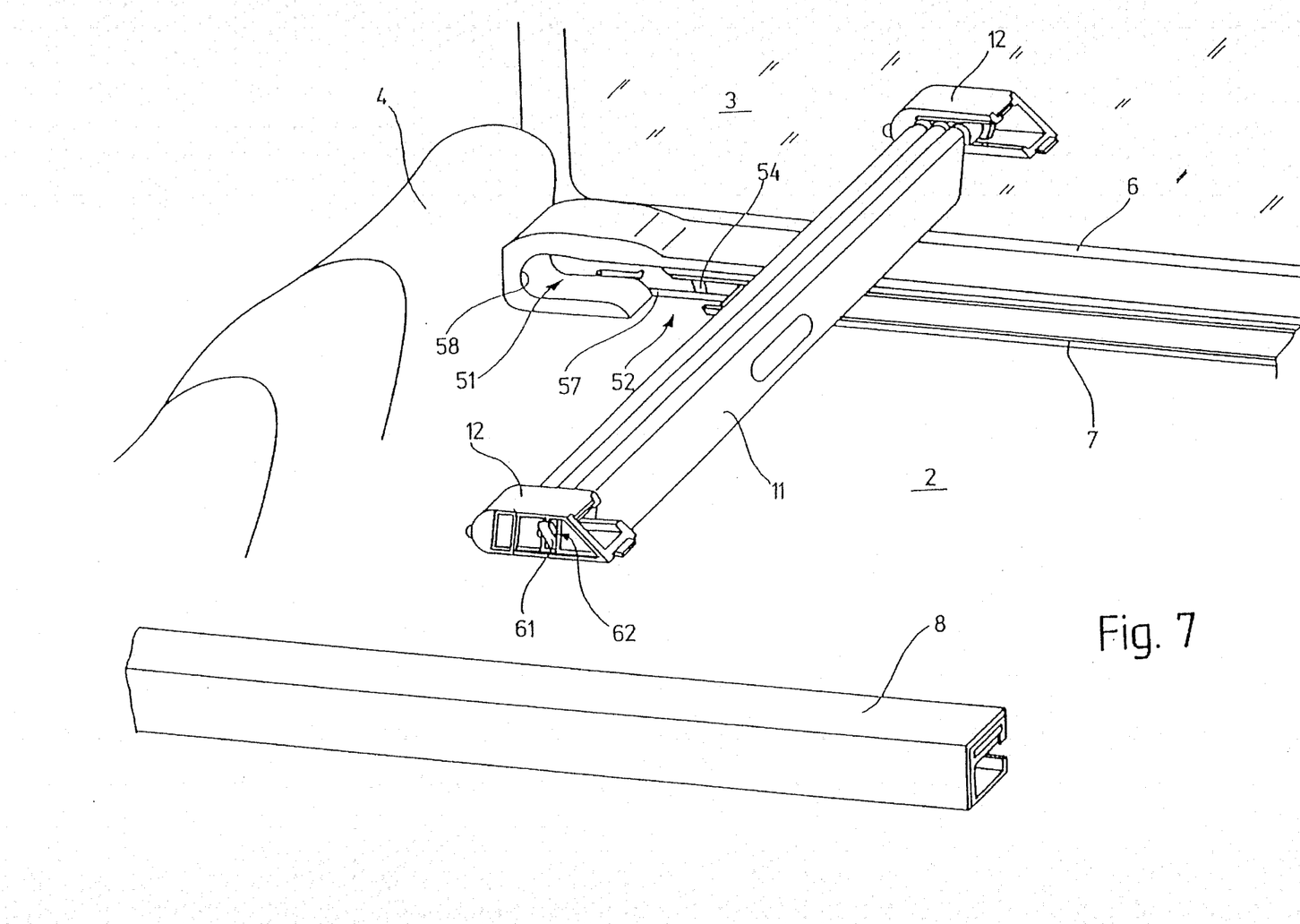
FIG. 7 is a perspective view of another embodiment of a cover according to the invention.
Figure 8:
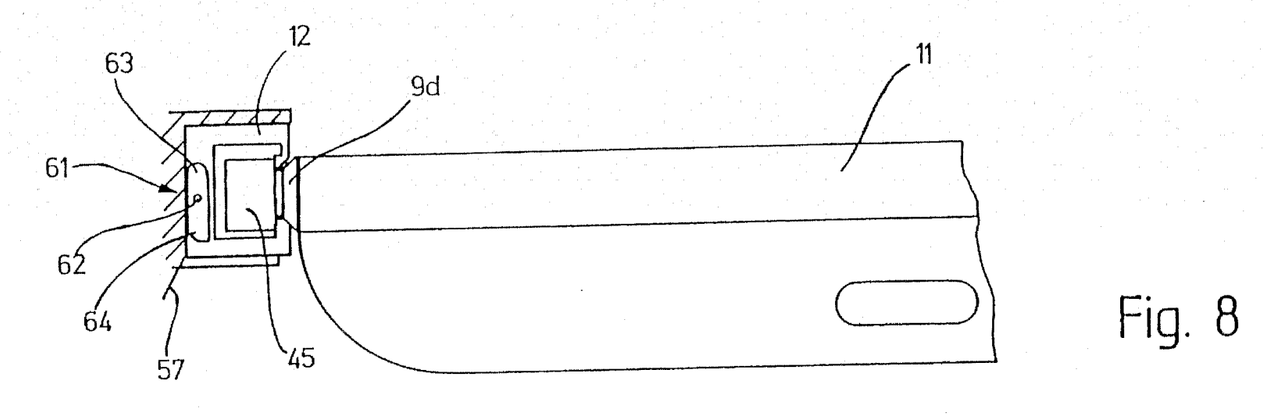
FIG. 8 is a cross sectional view, as seen from the guide rails, of the receptacle, web, and struts according to FIG. 7 properly positioned in the receiving pocket with the blocking member in the free position.
Figure 9:
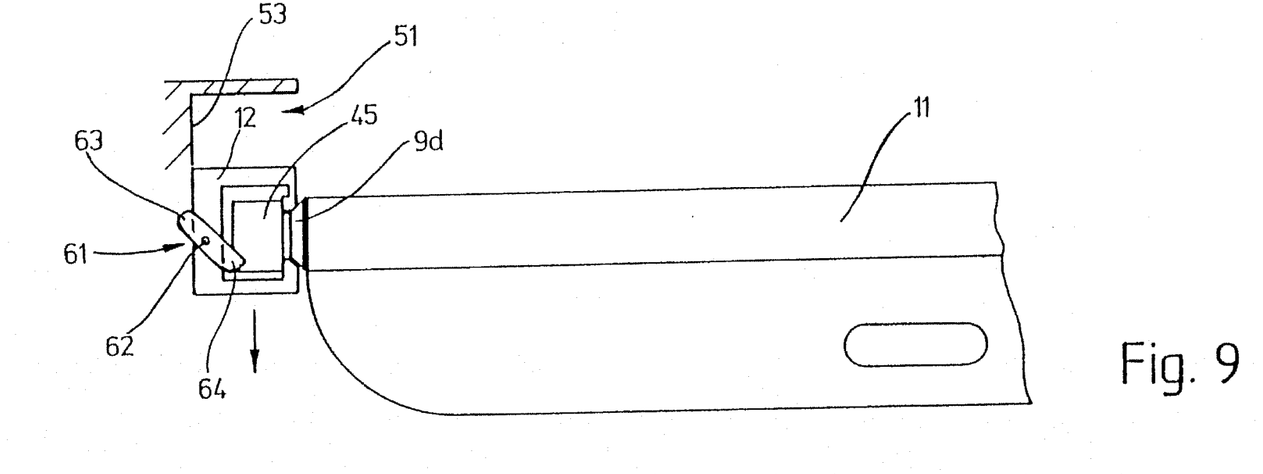
FIG. 9 is a cross sectional view similar to FIG. 8 of the receptacle, web, and struts partially taken out of the receiving pocket with the blocking member in the locked position.

While in FIGS. 1 to 4 an arrangement is shown in which the locking is accomplished by the locking member 25 being moved back and forth parallel to the longitudinal axis of the struts 9a to 9d, FIGS. 7 to 9 show an embodiment in which the locking member 25 is a two-armed lever capable of turning.

According to FIG. 7, the side wall 16 is a two-armed lever or bolt 61 which swings on a rotary axis 62. The rotary axis 62 is fixed in position in the side wall 15 and runs at a right angle to the longitudinal extension of the struts 9a to 9d, i.e., parallel to the longitudinal extension of the slot 13. The two-armed lever 61 consists of the upper arm part 63 and the lower arm part 64. The lower arm part 64 has the function of the already-described blocking member 27 and the upper arm part 63 has the function of the actuating member 28.

Except for the above mentioned differences, the construction of the cover 5 according to FIGS. 7 to 9 is exactly as already described.

In the locked position, the two-armed lever 61 swings obliquely, as shown in FIG. 9. As a result, the lower arm part 64 extends in the clear-space profile of the gear wheel 45 and prevents gear wheel 45 from running out of the receiving piece 12. The upper arm part 63, in contrast, is swung laterally outward and serves as the actuating member. When the roller cover 5 is installed, the two-armed lever 61 is turned about the axis 62 as the upper arm part 63 cooperates with the side wall 53 of the receiving pocket 51. Thereby the lower arm part 64 is withdrawn from the interior of the receiving piece 12, as shown in FIG. 8. Now the strut 9d can move freely back and forth with the gear wheels 45. In this second embodiment, there also is created a non-yielding closed linkage blocking in which the path of movement of the locking member between the free position and the locked position has a component parallel to the longitudinal axis of the struts 9a to 9d.

What is essential in all possible embodiments is that with receiving piece 12 taken out of the receiving pocket 51, a force which tends to draw away the receiving piece 12 from the respective struts 9a to 9d generates no force component, or no sufficiently great force component, which presses the locking member back out of the blocked or locked position into the free position. In the embodiment illustrated in FIGS. 1 to 6, for example, this goal is achieved by means of the blocking member 27 moving far enough into the interior of the receiving piece 12 so that no force arises that is directed against the action of the leaf spring 34. When the oblique surface of the gear wheel 45 presses against the blocking member 27, the only force exerted against blocking member 27 is downward. The blocking member 27, however, is prevented from moving downward by the groove 29.

In the embodiment illustrated in FIGS. 7 to 9, the pressing-back of the lower arm part 63 is prevented because the lower arm part 63 and the gear wheel 45 rest against one another at a steep enough angle so that it is not possible for gear wheel 45 to press back lower arm part 63 into the free position. When the receiving piece 12 is installed in the receiving pocket 51, however, the free unhampered movement of all the struts 9a to 9d with the exception of the strut 9a is ensured at all times.

While the invention has been described in connection with preferred embodiments, it will be understood that it is not intended to limit the invention to these embodiments. On the contrary, the invention is intended to cover all alternatives, modifications, and equivalents as may be included within the spirit and scope of the invention as defined by the appended claims.

I claim:

1. An assembly for covering an access opening of a storage space in a motor vehicle comprising a web for covering the access opening; opposing guide rails running parallel to one another in a spaced relationship, which run in a common plane over the access opening to be closed by the web; a number of struts fastened to the web in parallel spacing, which reinforce the web and are supported on their ends by the guide rails; receiving devices contained within pocket portions of the guide rails and cooperating with the guide rails for receiving all the struts when the web is in a retracted position exposing the access opening and which together with the struts and the web are separable from the pocket portions of the guide rails; locking members in the receiving devices, each being movable between a locked position which prevent the struts separating from the receiving device and a free position in which the struts are freely separable from the receiving device; and an actuating system in each receiving device that cooperates with an associated one of the pocket portions of the guide rail to transfer the locking member from the locked position when the receiving device is separated from the respective pocket portion into the free position when the receiving device is inserted into the pocket portion.

2. The assembly according to claim 1, wherein each of the locking members has guide structure within the receiving device.

3. The assembly according to claim 1, wherein the direction of movement of each of the locking members has a component parallel to the struts.

4. The assembly according to claim 1, wherein each of the locking members is constructed with an actuating member.

5. The assembly according to claim 1, wherein each of the locking members is constructed as a bolt capable of turning about an axis.

6. The assembly according to claim 5, wherein a rotation axis of each of the locking members lies substantially transversely to the longitudinal axis of the struts.

7. The assembly according to claim 1, wherein each of the locking members has a stop surface which in the locked position extends into a path of movement of the ends of the struts in the receiving devices.

8. The assembly according to claim 1, wherein each of the locking members includes a security arrangement to hold the locking member in the locked position when the associated receiving device is separated from the receiving pocket.

9. The assembly according to claim 8, wherein the security arrangement includes a spring.

10. The assembly according to claim 1, wherein each actuating system includes a movable projection that is biased to project from an outer side of the respective receiving device when the receiving device is separated from the receiving pocket.

11. The assembly according to claim 10, wherein each of the receiving devices has a protecting collar for protection against inadvertent actuation of the actuating member.

12. The assembly according to claim 1, wherein each receiving device has a guide means which cooperates with the corresponding guide rail to correctly position the receiving device with respect to the guide rail.

13. The assembly according to claim 12, wherein the guide means includes two projections which grip upper and lower sides of the end of the corresponding rail.

14. The assembly according to claim 1, including a biasing arrangement for pressing each of the receiving devices against an end of the corresponding guide rail.

15. The assembly according to claim 14, wherein at least one surface of the receiving device is slanted to lie obliquely to a plane containing the longitudinal axes of the guide rails.

16. The assembly according to claim 1, wherein the receiving device and receiving pocket have first and second cooperating parts, respectively, that transfer the associated locking member into the freed position only when the receiving device is mated with the receiving pocket.

17. The assembly according to claim 16, wherein the first cooperating part is a projection and that the second cooperating part is a slide block guide.

18. The assembly according to claim 17, wherein the slide block guide is comprised of two sections which meet at an apex in a manner that ensures the receiving device securely rests against the appropriate guide rail end during an insertion movement of the receiving device into the receiving pocket, and ensures the receiving device does not engage the guide rail end during an extraction movement of the receiving device from the receiving pocket.

19. The assembly according to claim 1, wherein the receiving pocket has an opening pointing in the direction of the opposite receiving pocket and an insertion opening for receiving one of the receiving devices.

20. The assembly according to claim 1, wherein the receiving device is closed on an end opposite an end mated to the guide rail.

21. The assembly according to claim 20, wherein each of the receiving devices has a rest arrangement to hold the strut adjacent to the closed end.

22. The assembly according to claim 1, including a synchronizing arrangement to secure a parallel movement of at least the strut covering the greatest distance when the roller web is extracted or retracted.

23. The assembly according to claim 22, wherein the synchronizing arrangement comprises gear wheels attached to the ends of the strut which cooperate with gear racks contained in the guide rails.

* * * * *